US007416379B2

(12) United States Patent
Roesch

(10) Patent No.: US 7,416,379 B2
(45) Date of Patent: Aug. 26, 2008

(54) INTERLACING DEVICE FOR A PALLETIZING MACHINE AND PALLETIZING MACHINE EQUIPPED WITH ONE SUCH DEVICE

(75) Inventor: Yves Roesch, Munchhouse (FR)

(73) Assignee: Pack Industrie S.A., Rixheim (FR)

( * ) Notice: Subject to any disclaimer, the term of this patent is extended or adjusted under 35 U.S.C. 154(b) by 129 days.

(21) Appl. No.: 10/523,322

(22) PCT Filed: Jul. 28, 2003

(86) PCT No.: PCT/FR03/02381

§ 371 (c)(1),
(2), (4) Date: Feb. 2, 2005

(87) PCT Pub. No.: WO2004/014732

PCT Pub. Date: Feb. 19, 2004

(65) Prior Publication Data

US 2006/0182614 A1   Aug. 17, 2006

(30) Foreign Application Priority Data

Aug. 6, 2002    (FR) .................................. 02 10029

(51) Int. Cl.
*B65G 1/18*    (2006.01)
*B65B 35/54*   (2006.01)
(52) U.S. Cl. .................. 414/799; 414/789.5; 53/157
(58) Field of Classification Search .............. 414/792.9, 414/793, 799, 792.5, 789.5, 929, 933; 53/157, 53/176, 447

See application file for complete search history.

(56) References Cited

U.S. PATENT DOCUMENTS

| 1,918,800 | A | * | 7/1933 | Denton ..................... 414/789.5 |
| 2,635,965 | A | * | 4/1953 | Hensgen et al. ............. 426/414 |
| 2,767,863 | A | * | 10/1956 | Botley ...................... 414/788.8 |
| 3,664,089 | A | * | 5/1972 | Keck ........................... 53/593 |
| 3,693,321 | A | * | 9/1972 | Nilsson ........................ 53/244 |

(Continued)

FOREIGN PATENT DOCUMENTS

EP          1 008 526 A      6/2000

(Continued)

*Primary Examiner*—Saul J. Rodriguez
*Assistant Examiner*—Gregory W Adams
(74) *Attorney, Agent, or Firm*—Davis Bujold & Daniels, P.L.L.C.

(57) ABSTRACT

The invention relates to an interlacing device which can be used automatically to interlace long products on a transport pallet in an economical and optimum manner, which can be adapted to tubes of any length and which operates concurrently with the palletizing machine. The inventive interlacing device (10) is characterized in that it comprises at least one interlacing gantry (11) which extends parallel to the palletized products along at least part of the length thereof and which comprises at least one wire guide (20), the wire guide being fed by at least one interlacing (12') link reel (12). The aforementioned interlacing device (10) also comprises drive means (14) which are connected to the interlacing gantry (11) in order to move same alternatively between at least two end positions such as to move the guide wire (20) alternatively from one side of the transport pallet (7) to the other in at least one interlacing plane (P) which is essentially perpendicular to the palletized products (2). The invention is suitable for palletizing any long product, e.g. cylindrical tubes.

5 Claims, 8 Drawing Sheets

U.S. PATENT DOCUMENTS 4,079,645 A * 3/1978 Nunes et al. .................... 83/92
4,537,010 A * 8/1985 Mojden et al. ................. 53/447
5,168,687 A * 12/1992 Chujo et al. .................. 53/445
5,769,601 A 6/1998 Agne et al.

FOREIGN PATENT DOCUMENTS

FR  2 811 652 A   1/2002
WO  02/06121 A2   1/2002

* cited by examiner

INTERLACING DEVICE FOR A PALLETIZING MACHINE AND PALLETIZING MACHINE EQUIPPED WITH ONE SUCH DEVICE

This application is a national stage completion of PCT/FR2003/002381 filed Jul. 28, 2003 which claims priority from French Application Serial No. 02/10029 filed Aug. 6, 2002.

FIELD OF THE INVENTION

The present invention concerns an interlacing device for a machine which palletizes elongated products, as well as a palletizing machine equipped with such a device, said palletizing machine comprising at least one gantry, one carrier moving in vertical translation along said gantry, and a gripping device moving in horizontal translation along said carrier, designed to remove said products from a storage ramp and place them on the transport pallet.

BACKGROUND OF THE INVENTION

Palletizing machines of this type for automatically or semi-automatically palletizing elongated products are well known, for example, machines to palletize cylindrical tubes directly and continuously as they exit the production line. Palletizing tubes is a delicate operation because when they are arranged side by side and in superimposed layers, they have a tendency to roll on top of each other. This problem can be resolved by interlacing the rows of tubes using a tie which may be a string, a ribbon, a strap, a band, a fabric strip, a film or other equivalent means made of fiber, wire, natural and/or synthetic material, said tie being woven, non-woven, extruded, or manufactured by any other method, and the function of said tie being to maintain the rows in place and prevent the tubes from falling before the pallet is encircled. This interlacing is usually done manually by an operator who must place the spool or spools of tie material on either side of the pallet as the rows advance. Since the tubes may reach up to ten feet in length, if they are very long the number of spools of interlacing required will double, necessitating more than one operator.

Publication No. WO 02/06121 by the same applicant describes a palletizing machine equipped with an interlacing device for automatically interlacing tubes while they are being palletized. This interlacing device comprises two supports located on either side of the transport pallet and designed to alternately receive one or more spools of interlacing material. This device also comprises a gripping means located on the device which grips the tubes or located on an additional gripping device, designed to displace the spool or spools of interlacing material from one support to the other while the rows of tubes placed upon the transport pallet are advancing. Since this interlacing device is integral with the palletizing machine, it does not offer an optimal industrial solution. Actually, if the gripping means are located on the tube gripping device, it is necessary to interrupt the palletizing cycle to move the spool of interlacing material from one support to the other, which has a negative impact on the global output of the palletizing machine. If the gripping means are located on a gripping device that is supplemental to the tube gripping device, manufacturing the interlacing device becomes complex and has a negative impact on the global cost of the palletizing machine.

U.S. Pat. No. 5,769,601 proposes an interlacing device that is integrated with a palletizing machine and operating in the reverse manner of the machine that is the object of the invention. The tubes are moved to the upper portion of the machine by a conveyor and pushed onto a pallet by cylinders, forming a row. After each row, the pallet descends one level to permit formation of a new row. A winder moving in perpendicular translation to said tubes unfurls a strip of paper or plastic film between the rows of tubes to maintain them in place. This interlacing device is not transferable to the palletizing machine of the invention and does not permit interlacing of long tubes.

SUMMARY OF THE INVENTION

The goal of the present invention is to remedy these disadvantages by proposing an economical interlacing device which can function concurrently with the palletizing machine, thereby eliminating reduced output, and which is suitable for use with any length of tube.

This goal is achieved by an interlacing device such as the one defined in the preamble and characterized in that it comprises at least one interlacing gantry designed to extend essentially parallel to said products along at least a portion of their length, said interlacing gantry comprising at least one guide supplied by at least one spool of interlacing material, and said interlacing device also comprising drive means coupled with said interlacing gantry which alternately displace the gantry between at least two end positions so as to displace said guide in at least one interlacing plane essentially perpendicular to said palletized products alternately from one side of said transport pallet to the other.

The said drive means may be designed to cause the interlacing gantry to move in at least one alternating pivoting motion and/or at least one alternating translation motion.

The drive means may be selected from the group comprising at least electric motors, hydraulic and pneumatic cylinders. Depending upon the drive means selected, they may also comprise at least one transmission system selected from the group comprising at least chain and pinion, pulleys and belts.

In a preferred embodiment, the interlacing device comprises at least one chassis integrating the guide means which guide said interlacing gantry translationally, said guide means consisting of at least one pathway formed in the chassis to receive rollers integral with the vertical posts on said interlacing gantry.

Advantageously, the interlacing device comprises at least two guides located on the interlacing gantry for distributing at least two interlacing ties in at least two essentially parallel interlacing planes distributed along said palletized products.

According to one variation, at least one of the guides is associated with activation means which alternately displace it in translation along said interlacing gantry for a predetermined distance in order to displace said corresponding interlacing plane essentially parallel to itself, said activating means being selected from the group comprising at least electric motors, hydraulic and pneumatic cylinders.

This goal is further achieved by a palletizing machine such as that defined in the preamble and characterized in that it comprises at least one interlacing device such as the one defined above.

In the preferred form of embodiment, the interlacing device comprises at least one interlacing gantry with dimensions that allow it to be integrated inside the gantry of the palletizing machine below the gripping device and outside the transport pallet and the palletized products.

This gripping device advantageously comprises means for controlling its drive means, associated with the means for controlling said palletizing machine, to displace said interlacing gantry alternately from one side of the transport pallet to the other, essentially parallel to the interlacing planes, as the products are being placed on said transport pallet and according to a predetermined interlacing pattern.

According to one variation, at least one of the guides on the interlacing device is associated with activating means designed to displace it in alternate translation along said interlacing gantry for a predetermined distance so as to displace said corresponding interlacing plane essentially parallel to itself.

In this case the control means are designed to control this activation means so as to wrap said interlacing material around the posts on said pallet while product palletizing progresses and in the predetermined interlacing pattern.

BRIEF DESCRIPTION OF THE DRAWINGS

The present invention and its advantages will be better understood from the following description of various embodiments given by way of non-limiting example and with reference to the attached drawings, wherein.

DETAILED DESCRIPTION OF THE INVENTION

Figure 1:
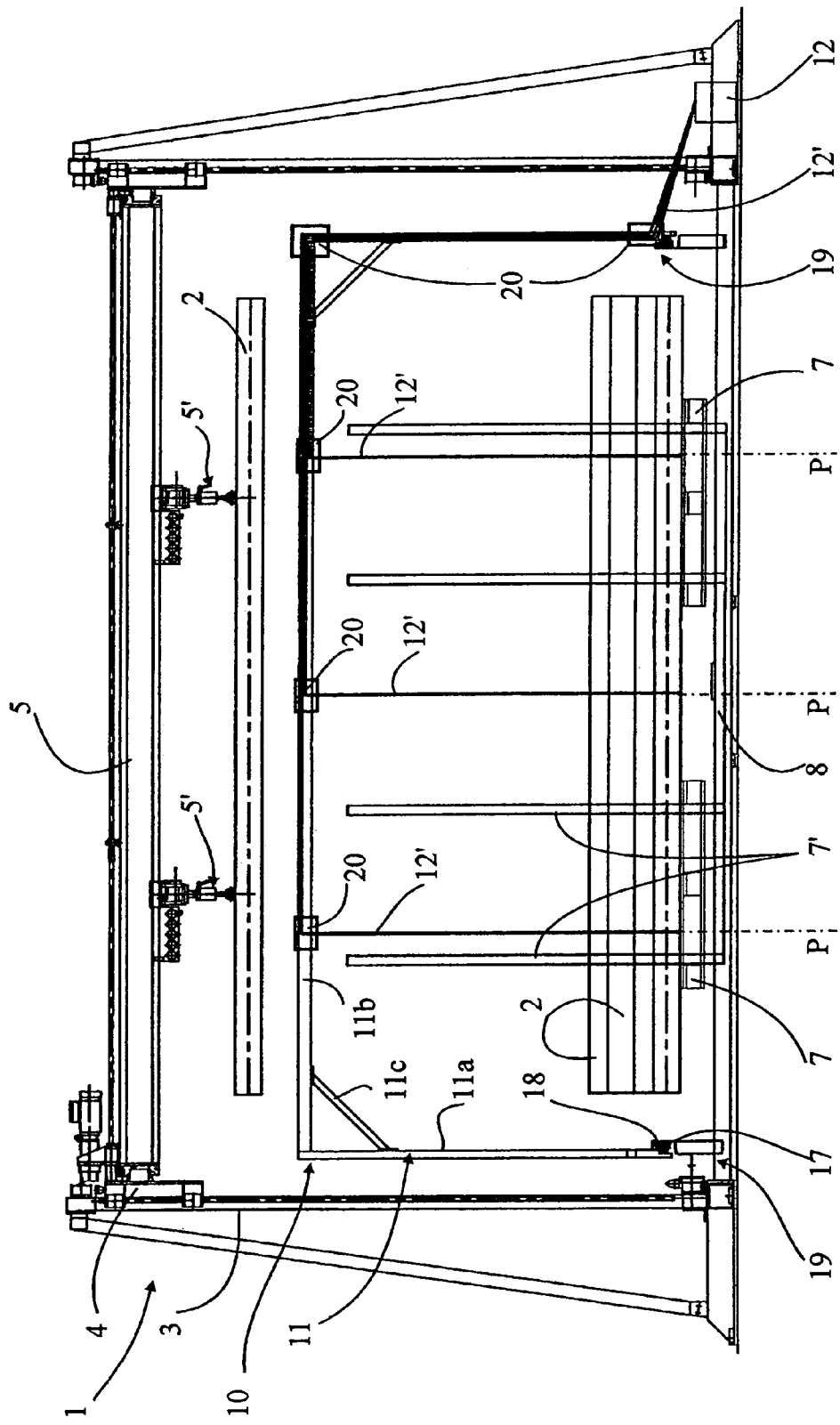
FIG. 1 is a surface view of the palletizing machine equipped with an interlacing device according to the invention.
Figure 2:
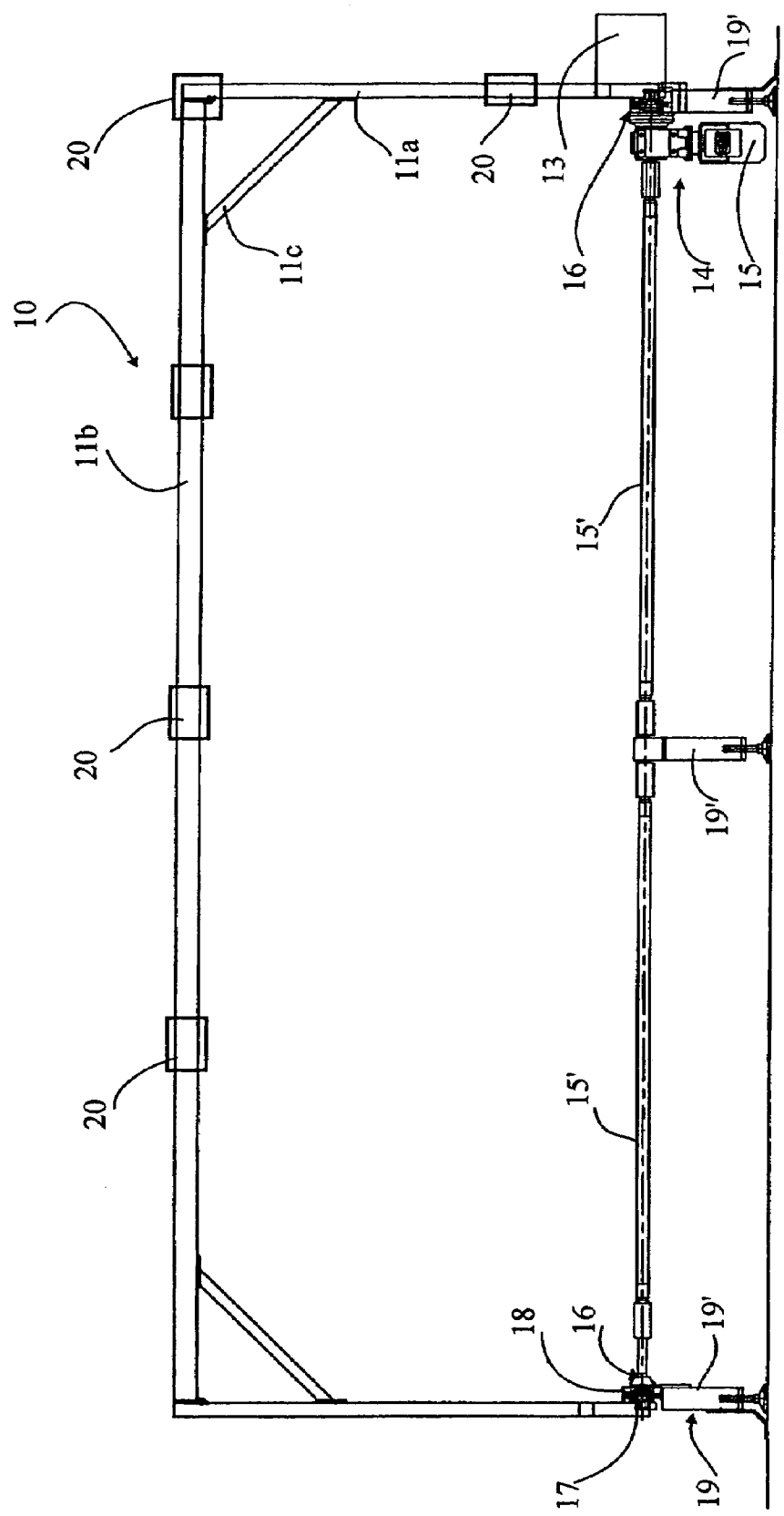
FIG. 2 is a surface view of only the interlacing device.
Figure 3:
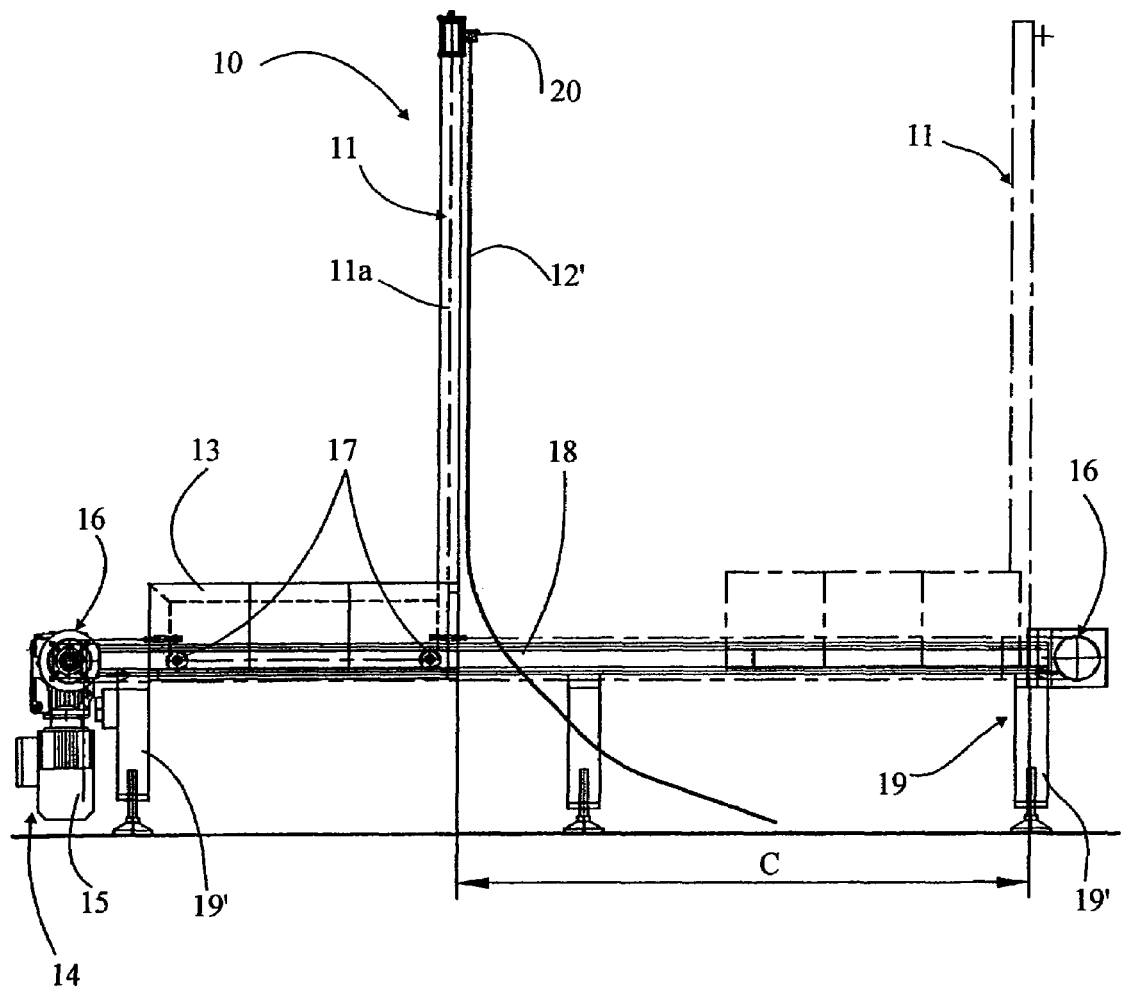
FIG. 3 is a side view of the interlacing device of FIG. 2 shown in its two end positions.

With reference to the drawings, interlacing device 10, 10' according to the invention is designed to equip a machine 1 for palletizing elongated products, for example, cylindrical tubes 2 varying in length from approximately 1 to 10 meters.

This palletizing machine 1 is usually, but not necessarily, located at the end of a continuous production line for tubes 2 and allows them to be automatically or semi-automatically palletized, using a continuous or discontinuous method. For this purpose, it comprises a gantry 3 to which is attached a carrier 4 which can move in vertical translation. At least one griping device 5 with claws, air vents, or other adaptation is attached to said carrier 4 in horizontal translation and is designed to remove tubes 2 located side by side in parallel on an inclined storage ramp 6 and deposit them side by side in parallel on at least one transport pallet 7 or any other fixed or movable support. In the example shown, gripping device 5 consists of a gripping girder 5 extending along the entire length of tubes 2, said gripping girder 5 being equipped with air vents 5' allowing it to carry tubes 2 using suction. Likewise, in the example shown, transport pallet 7 is supported by a movable carrier 8, but may also be located between fixed and/or removable upright posts.

The automatic operation of this palletizing machine 1 is ensured by a control means advantageously comprising a computer which directs the various displacements of carrier 4 and gripping girder 5 to obtain the optimum kinematics and cycle of operation. This operating cycle is summarized below with reference to FIGS. 4A and 4B:

1. displacement of gripping girder 5 from the left side of gantry 3 and descent of carrier 4 to remove the tube or tubes 2 from storage ramp 6;

2. ascent of carrier 4 and then displacement of gripping girder 5 from the right side of gantry 3 for a longer or shorter distance, as determined by the progression of rows of tubes 2 positioned on transport pallet 7;

3. descent of carrier 4 to deposit the tube or tubes 2 on transport pallet 7 or on the last row of tubes 2 positioned on this pallet;

4. ascent of carrier 4 to begin another cycle.

An interlacing device 10 is associated with palletizing machine 1 and is designed to effect automatic interlacing of rows of tubes 2 on transport pallet 7, ensuring that the tubes and the rows remain in their relative positions.

With reference to FIGS. 1 through 5, said interlacing device 10 comprises at least one interlacing gantry 11 extending essentially parallel to tubes 2 along either a portion or the entire length thereof and becoming integrated within the interior of gantry 3 of palletizing machine 1. Specifically, interlacing gantry 11 must be displaceable inside palletizing machine 1 below gripping girder 5 and perpendicular to palletized tubes 2. This interlacing gantry 11 consists specifically of two vertical upright posts 11a joined at the top by a horizontal cross beam 11b and two struts 11c. If it is formed of a single portion, it extends for the entire length of tubes 2. Depending upon the length of tubes 2, it may be divided into two portions, each of which extends at the most halfway across tubes 2. This interlacing gantry 11 is supplied on one side or on two sides by one or more interlacing spools 12 located either in a bobbin-carrying case 13 on the interlacing gantry 11 as in FIG. 2, on the floor as in FIG. 1, on a bobbin-carrying rack (not shown) or on any other equivalent movable or fixed support.

This interlacing gantry 11 is designed to be alternately movable in at least one direction essentially perpendicular to tubes 2 between at least two end positions located essentially on either side of transport pallet 7. This alternating movement allows interlacing spool or spools 12 to unwind in interlacing planes P that are essentially parallel to each other and perpendicular to tubes 2. This alternating movement may consist of pivoting around a low point or translational movement along a course C as in the example shown. Interlacing device 10 comprises for this purpose a drive mechanism 14 which may consist of an electric motor 15 and a gear and chain transmission 16 or pulley and belt or other equivalent system. The drive mechanism 14 may also consist of a system of hydraulic or pneumatic cylinders or any other equivalent system. Interlacing gantry 11 is translationally guided by the appropriate guide means comprising, for example, rollers 17, such as guide wheels, circulating within at least one pathway 18 provided in chassis 19, or some other equivalent means. Rollers 17 are provided on each vertical post 11a on the interlacing gantry to guide it accurately. Chassis 19, in the example shown, consists of two elongated bases 19' that are essentially parallel, adjustable in height at the bottom and distributed at each extremity of interlacing gantry 11 to guide each vertical post 11a. A third base 19' is provided in a median area of the interlacing gantry 11 to transmit the drive force of electric motor 15 on the other side of interlacing gantry 11 through a transmission box and transmission axles so as to also ensure that the two vertical posts 11a on interlacing gantry 11 are driven simultaneously.

Interlacing gantry 11 also comprises guides 20 to guide and separate interlacing ties 12' unwinding from spool 12. Depending upon the type of interlacing 12' used (wire, band, sheet, film), these guides may be adapted. In the example shown, interlacing tie 12' is a wire product and guides 20 are guide-wires, the term used throughout the remainder of the description. These guide-wires 20 may consist, for example, of guide wheels, eyelets, combs, or other equivalent guide-wire, used alone or in combination. These guide-wires 20 may be passive or active, that is, drive in rotation, for example, as with the guide wheels. They are positioned in several places, such as, for example, on posts 11 a near the starting point of interlacing ties 12', on cross beam 11b at each departure point of the interlacing tie 12', in the corner of gantry 11 to direct interlacing ties 12, etc., and their position can be regulated. Guide-wires 20 of cross beam 11b are positioned in interlacing planes P defined for each type and length of tubes 2. With tubes 2 of short length, about 1 to 3 meters, interlacing takes place in the two end zones. With longer tubes, interlacing must take place in the two end zones and in one or two median zones as in the example in FIG. 1. For this reason, interlacing device 10 must be supplied by a number of spools 12 of interlacing material that is equivalent to the number of interlacing planes P. As a function of the number of spools 12, interlacing gantry 11 can be supplied from two sides. When spools 12 are empty, they must be replaced by full spools 12. The end of spools 12 can be indexed in different ways by taking account of either its weight or the length of interlacing material 12'. This data is introduced into the computer controlling interlacing device 10 so that it produces a visual or auditory signal when the end of the spool is detected, warning the operator to exchange the empty spool for a full spool. Joining the end of spool 12 which is used up with the beginning of spool 12 can be done manually or automatically using a knotting device or other equivalent means.

Figure 5:
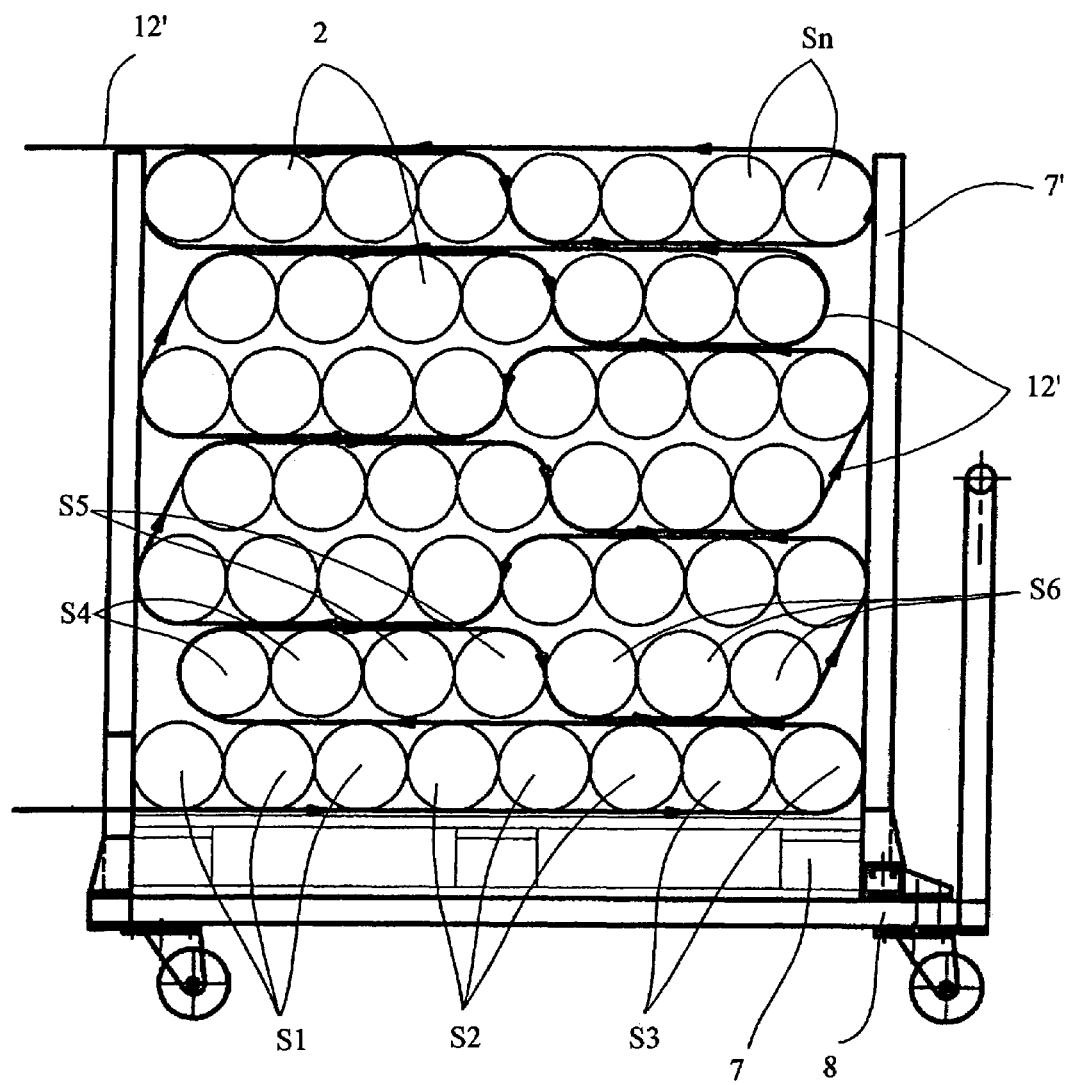
FIG. 5 shows one example of interlacing tubes superimposed in layers on a pallet.

Interlacing device 10 comprises either its own control means or a control means integrated into palletizing machine 1. In both cases, these control means are dependent upon the operation of palletizing machine 1 so as to displace interlacing gantry 11 automatically and alternately from one side to the other of transport pallet 7 as the rows of tubes 2 are deposited on this transport pallet 7 and according to a predetermined interlacing pattern, one example of which is shown in FIG. 5.

Figure 4A:
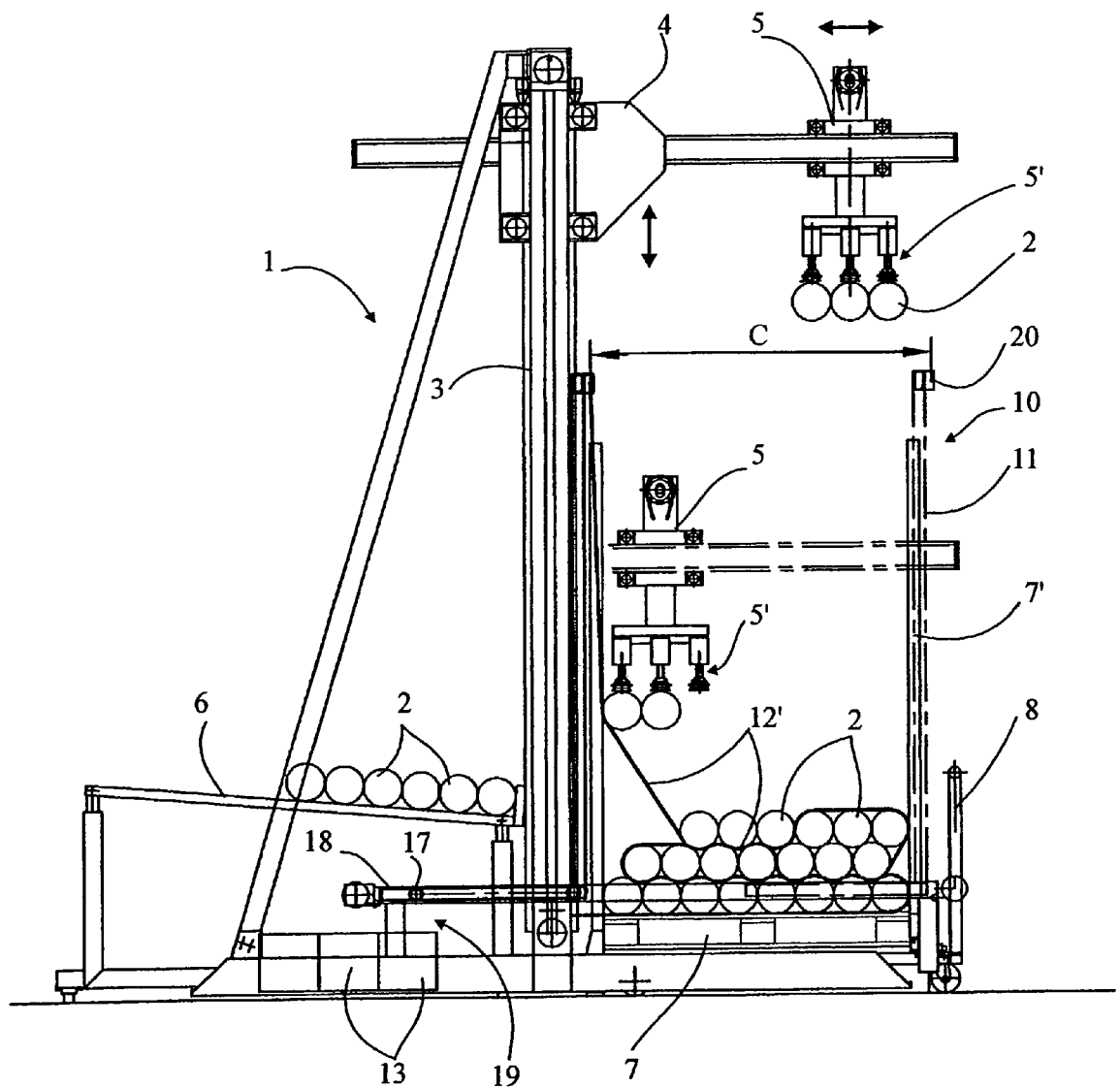
FIGS. 4A and 4B are side views of the palletizing machine of FIG. 1 with the interlacing device in the two end positions of FIG. 3, respectively.
Figure 4B:
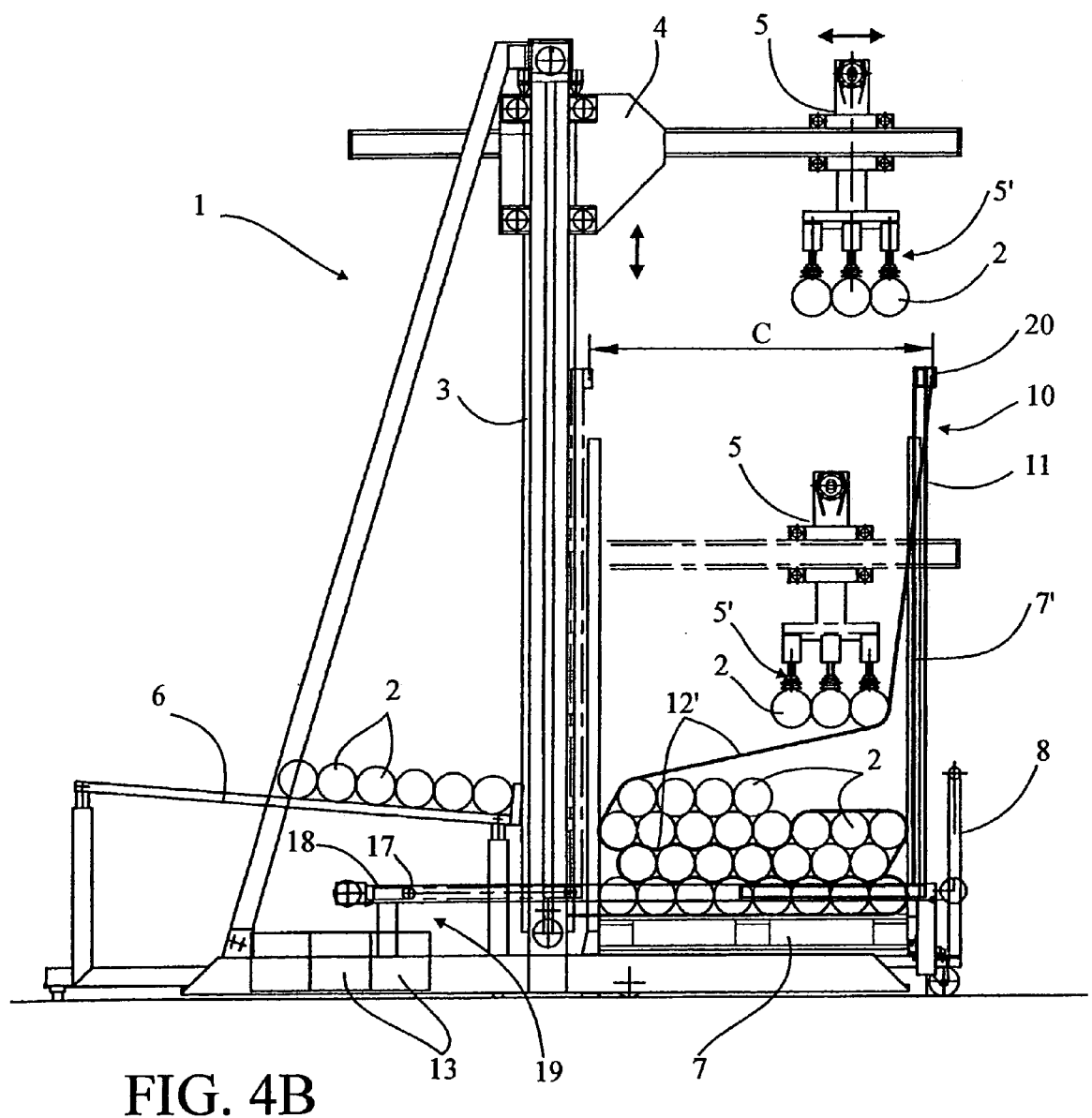

How this interlacing pattern is accomplished is explained with reference to FIGS. 4A and 4B. In these drawings, interlacing gantry 11 is shown in its two end positions: its departure position is shown by a dotted line and its arrival position by a solid line. In addition, in these drawings, girder 5 for gripping tubes 2 is shown in two positions: an upper position by a solid line and a lower position by a dotted line. Said gripping girder 5 comprises three air vent systems 5' allowing it to carry a maximum of three tubes 2.

At the beginning of a palletizing cycle, interlacing gantry 11 is displaced from the left to the right of transport pallet 7 (cf. FIG. 4B) to place interlacing ties 12' on pallet 7, letting the ends overhang so knots can be tied at the end of the palletizing process. A first row of eight tubes 2 is deposited on pallet 7 while placing interlacing tie 12' on transport pallet 7. This first row may be formed by a first and a second series S1, S2 of three tubes 2 and then a third series S3 of two tubes 2 deposited side by side. Interlacing gantry 11 is displaced from the right to the left of transport pallet 7 (cf. FIG. 4A) before a fourth and a fifth series S4, S5 of three tubes 2 is deposited sided by side in a quincuncial arrangement in the first row. Interlacing gantry 11 is moved back to the right of transport pallet 7 before a sixth series S6 of three tubes 2 is deposited in a quincuncial arrangement beside the fifth series S5 to form the second row of tubes 2. The formation of rows of superimposed tubes 2 combined with the insertion of interlacing ties 12' continues in this way until the desired height is reached. Of course the number of rows depends on the weight and dimensions of tubes 2. Finally, when the last series Sn of tubes 2 has been deposited to complete the last row, interlacing gantry 11 is returned to the left of transport pallet 7. The operator cuts interlacing material 12' and then removes movable chassis 8 in order to position another movable chassis 8 in front of gantry 3 to begin another palletization cycle. The use of a movable chassis 8 reduces the interruption between two palletizing cycles by some seconds and prevents tubes 2 from accumulating at storage ramp 6. The operator can then finish knotting the ends of interlacing tie 12' in order to evacuate transport pallet 7 of tubes 2 using a stacking device or some other means. Obviously, it is possible to automate the process of evacuating full movable carrier 8 and replacing it with an empty movable carrier 8.

Figure 6:
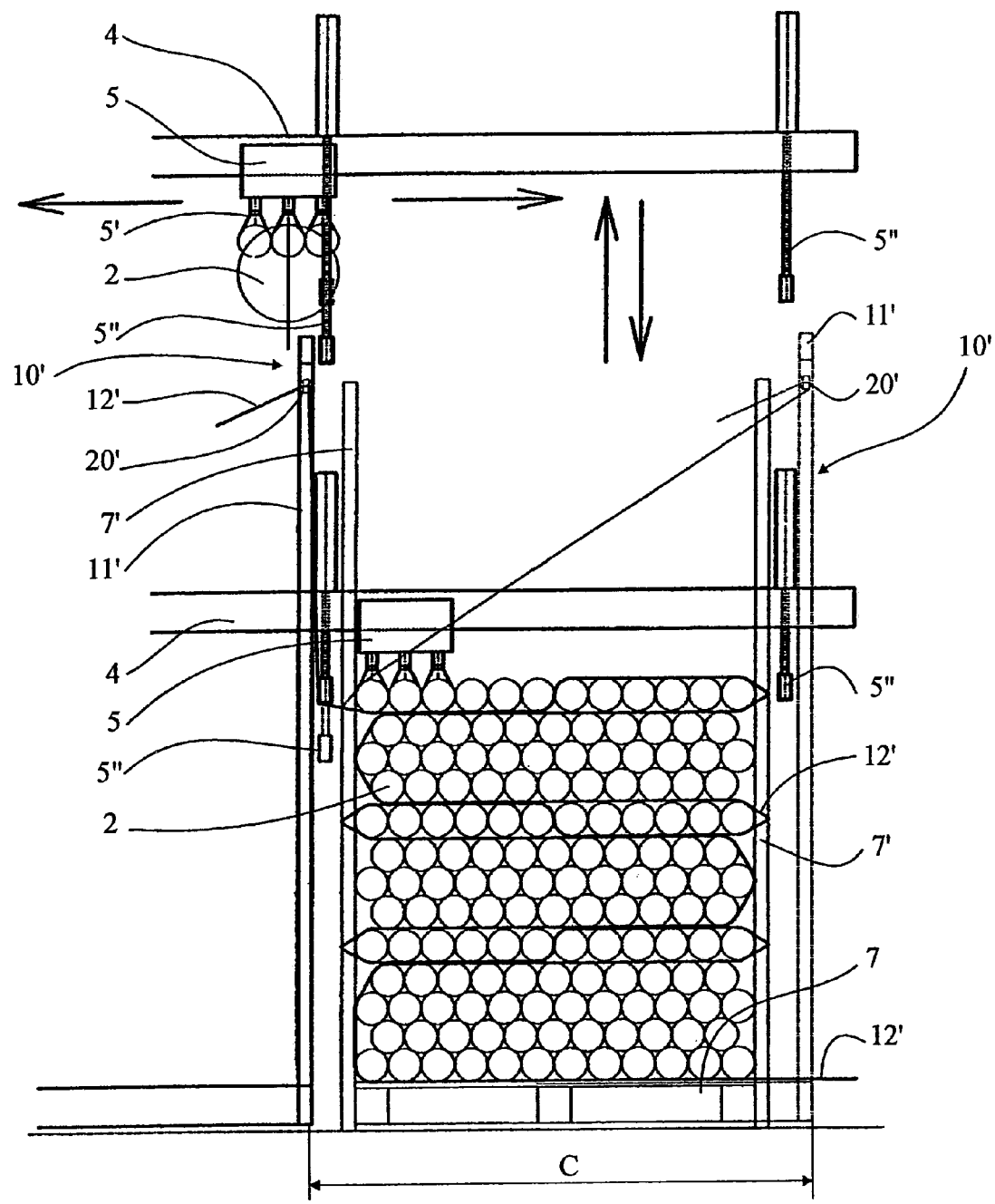
FIGS. 6 and 7 are side views and top views of one variation of the interlacing device of the invention.
Figure 7:
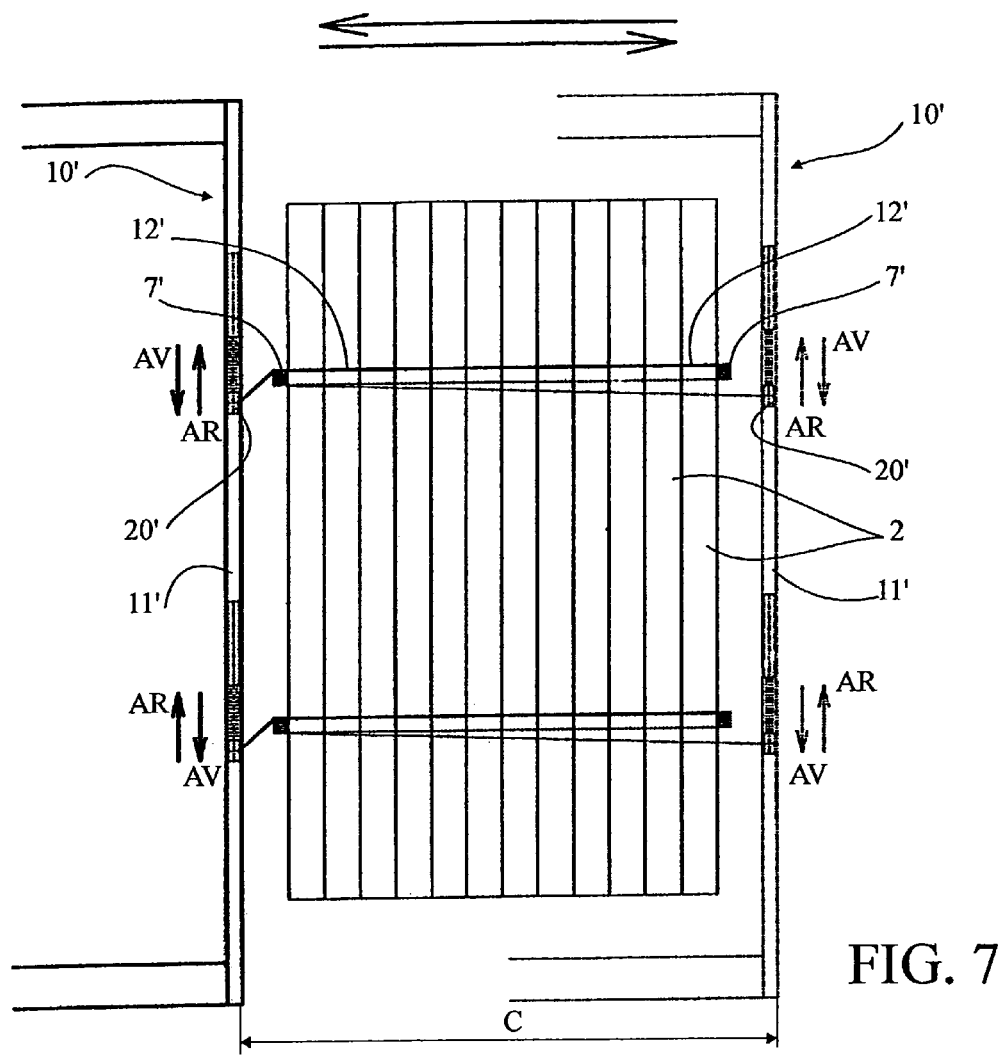
Figure 8:
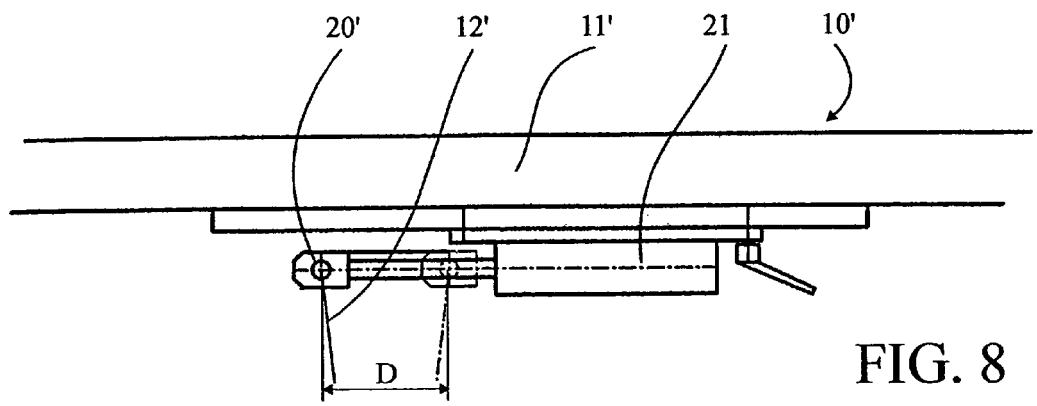
FIG. 8 is a detailed view of a guide-wire of the variation of FIGS. 6 and 7

In certain applications interlacing can be improved or reinforced by winding interlacing material 12' around posts 7' that extend vertically, for example, from the four corners of pallet 7. FIGS. 6 through 8 illustrate a variation of an embodiment of interlacing device 10' allowing this specific type of interlacing to take place. Guide-wires 20' provided on interlacing gantry 11' are associated with activating means 21 which displaces them in alternate translation AV/AR along this interlacing gantry 11' on a predetermined course D. The activating means 21 shown in the example in FIG. 8 consists of dual hydraulic or pneumatic cylinders driven by the control means for interlacing gantry 10' or for palletizing machine 1. In this embodiment, carrier 1 holding gripping device 5 comprises supplemental pieces called pushers 5'' extending vertically, the role of which is to push interlacing material 12' downward along posts 7'. These pushers 5'' may be fixed or driven to move in alternating vertical translation using cylinders, for example.

The operation of this interlacing device 10' is explained with reference to FIGS. 6 and 7. The tubes 2 to be palletized, their length and the interlacing pattern selected determine how interlacing material 12' will encircle posts 7' in order to connect tubes 2 to pallet 7.

At the outset of a palletizing cycle, interlacing gantry 11' is displaced from the right to the left of transport pallet 7 on its course C to deposit interlacing material 12' on pallet 7, leaving the ends overhanging in order to be able to knot them at the end of the palletizing process. Four rows of tubes 2 are deposited on pallet 7 in a quincuncial pattern by gripping device 5. Interlacing gantry 11' is displaced from the left to the right of transport pallet 7 and guide-wires 20' are displaced in translation AR before a series of six tubes 2 is deposited. Interlacing gantry 11' is moved back to the left of transport pallet 7 and guide-wires 20' are displaced in translation AV before a series of six tubes 2 is deposited beside the preceding one to form the fifth row of tubes 2. Interlacing gantry 11' is displaced to the right closing the loop in the interlacing material 12' formed around opposing posts 7'. Three other rows of tubes 2 are deposited in a quincuncial pattern before interlacing gantry 11' is displaced to the left and guide wires 20' are displaced in translation AR to form another loop around posts 7'. The formation of superimposed rows of tubes 2 combined with insertion of interlacing material 12' continues in this way until the desire height is reached. Obviously the number of rows depends upon the weight and dimensions of tubes 2. To end the interlacing process, the operator knots the ends of interlacing material 12'. In the example in FIG. 7, interlacing material 12' is wound in a loop around opposing posts 7'. It could, of course, be wound in another pattern, for example, a figure eight.

It is clearly apparent from this description that the invention achieves its stated objectives, that is, effecting the interlacing of rows of tubes 2 concurrently with the palletizing process, automatically, in an optimal and economic fashion. Moreover, interlacing device 10 of the invention can be adapted to any length of tube 2 as well as to any existing automatic palletizing machine 1 that operates on the same principle.

Obviously, the present invention is not limited to the exemplary embodiments described, but extends to any modification and variation obvious to a person skilled in the art.

The invention claimed is:

1. A palletizing machine (1) having an interlacing device (10, 10') for palletizing elongated cylindrical products (2), the palletizing machine (1) comprising:
    at least one upright palletizing gantry (3), at least one carrier (4) being supported by and vertically slidable along the at least one upright palletizing gantry (3), and at least one gripping device (5) being supported by and horizontally slidable along the at least one carrier (4) to transfer the elongated cylindrical products (2) from a storage ramp (6) to a transport pallet (7);
    the interlacing device (10, 10') is separate from the palletizing machine (1) and comprises at least one interlacing gantry (11, 11'), which comprises
    at least one interlacing guide (20, 20') for supplying an interlacing material (12') from at least one spool (12);
    at least two upright posts having top ends and bottom ends, the top ends of the at least two upright posts are interconnected by a cross-beam, which generally extends parallel to and along at least a portion of a length of the elongated cylindrical products (2) when palletized, the cross-beam having a greater length than the length of the elongated cylindrical products (2), the bottom ends of the at least two upright posts each have at least one guide which is received and slidably supported by one of at least two fixed guide pathways, which extend substantially perpendicular to the cross-beam for facilitating movement of the cross-beam substantially normal to the at least two fixed guide pathways and the at least one carrier (4) of the palletizing machine (1), the interlacing device (10, 10') also comprises a drive mechanism, which is separate from the operation of the palletizing machine (1), the drive mechanism is connected to the interlacing gantry (11, 11') for displacing the interlacing gantry (11, 11') inside the palletizing machine (1), vertically below the gripping device (5), and relative to the two fixed guide pathways, between at least two alternate end positions so as to displace the at least one interlacing guide (20, 20') in at least one interlacing plane (P), that is essentially perpendicular to the palletized products (2), alternately from one side to another side of the transport pallet (7).

2. The palletizing machine according to claim 1, wherein the at least one interlacing gantry (11, 11') has dimensions that permit the interlacing device (10, 10') to be located within the palletizing gantry (3) of the palletizing machine (1) below the gripping device (5) and a length of the cross beam is greater than a length of the transport pallet (7) and the palletized products (2) and smaller than a length of the gripping device.

3. The palletizing machine according to claim 1, wherein the gripping device (5') comprises means for controlling a drive mechanism associated with the drive mechanism of the palletizing machine (1) in order to displace the interlacing gantry (11, 11') alternately from the one side of the transport pallet (7) to the other side of the transport pallet (7) essentially parallel to the interlacing planes (P) as the products (2) are palletized on the transport pallet (7) according to a predetermined interlacing pattern.

4. The palletizing machine according to claim 1, wherein at least one of the interlacing guides (20') on the interlacing device (10') is associated with activating means (21) designed to displace the at least one of the interlacing guides (20') in alternate translation along the interlacing gantry (11') for a predetermined distance (D) so as to displace the corresponding interlacing plane (P) essentially parallel.

5. The palletizing machine according to claim 3, wherein the control means are designed to control the activating means (21) for activating the interlacing guide (20') so as to wrap the interlacing material (12') around posts (7') on the transport pallet (7) as palletization of the products (2) progresses and in the predetermined interlacing pattern.

* * * * *